United States Patent [19]

Smith

[11] Patent Number: 4,648,608
[45] Date of Patent: Mar. 10, 1987

[54] LOW-COST, KEYLESS CHUCK AND METHOD OF MANUFACTURE

[75] Inventor: Peter B. Smith, Raleigh, N.C.

[73] Assignee: Black & Decker, Inc., Newark, Del.

[21] Appl. No.: 706,273

[22] Filed: Feb. 27, 1985

[51] Int. Cl.⁴ .................................................. B23B 31/12
[52] U.S. Cl. ....................................... 279/1 K; 279/60
[58] Field of Search .............. 279/1 K, 1 ME, 60–65, 279/1 Q, 56–59

[56] References Cited

U.S. PATENT DOCUMENTS

| 66,081 | 6/1864 | Harris et al. ...................... 279/61 |
| 722,575 | 3/1902 | Gates ................................ 279/61 |
| 1,304,659 | 5/1919 | Cobey ............................... 279/63 |
| 1,321,969 | 11/1919 | Avis .................................. 279/60 |
| 1,784,002 | 9/1925 | Englund ............................ 279/60 |
| 2,607,602 | 8/1950 | Sasse ................................. 279/60 |
| 3,949,998 | 4/1976 | Dietzen et al. .................... 279/62 |
| 4,252,333 | 2/1981 | Vogel ................................ 279/72 |
| 4,305,597 | 12/1981 | McCarty ........................ 279/72 X |

FOREIGN PATENT DOCUMENTS 583004 12/1946 United Kingdom .................. 279/60
2041798 9/1980 United Kingdom ............... 279/1 K Primary Examiner—Gil Weidenfeld
Assistant Examiner—Steven C. Bishop
Attorney, Agent, or Firm—Finnegan, Henderson, Farabow, Garrett & Dunner

[57] ABSTRACT

A low-cost, keyless chuck has a body member having a threaded shaft and an integral circular plate portion with three angular disposed apertures the axes of which converge on the chuck axis of rotation. A hollow, stainless steel cone member is crimped to the periphery of the plate portion to provide an inside guide surface for three jaw members disposed in respective apertures. A nut with captured beveled washer and rotatable jaw member retainer is threaded to the shaft, and the jaw member ends distant the work-piece-gripping ends are connected to the retainer is used to advance and retract the jaw members. A plastic nut-actuating sleeve protectively covering the nut assembly and the jaw members is splined to the nut and rotatably carried by the cone member. The body member is formed by upsetting or cold heading a rod, and the cone member is formed by deep drawing sheet material.

10 Claims, 2 Drawing Figures

LOW-COST, KEYLESS CHUCK AND METHOD OF MANUFACTURE

BACKGROUND OF THE INVENTION

1. Field of the Invention

The present invention pertains to chucks for use in gripping and turning a work-piece, and particularly to low-cost keyless chucks for operation in both the forward and reverse direction of rotation.

2. Description of the Prior Art

Keyless chucks are known which can be operated in both the forward and reverse rotation directions, such as would be required in applications calling for the ability to both drive and extract screws, for instance. However, such prior art typically are fabricated from parts which require comparatively expensive machining operations which effectively prevent use in those tools and applicances where high volume and low price are major factors dictating commercial success.

Also, the need to prevent corrosion in the machined moving parts of the prior art chucks, particularly between the workpiece-gripping jaws and the guides for the jaws, often has necessitated corrosion inhibiting materials to be applied in a separate operation after the final machining operations. Machining parts directly from corrosion resistant materials such as stainless steel can be difficult and relatively expensive, depending upon the amount of machining required and the scrap produced.

SUMMARY OF THE INVENTION

In accordance with the purpose of the present invention, and as embodied and broadly described herein, the low-cost keyless chuck of the present invention for operation in both forward and reverse rotation about the chuck axis comprises a body member having a threaded shaft portion with an end configured to be drivingly rotated about the chuck axis, the body member also having a plate portion rigidly connected to the shaft portion, with the plate portion being oriented perpendicular to the shaft portion and located distant the driven shaft end. A plurality of apertures are formed in the plate portion and spaced about the chuck axis of rotation, the axes of the apertures converging on the axis of rotation at a point distant the plate portion, and plurality of jaw members are slidably disposed in a respective apertures. A hollow cone member is rigidly fixed to the plate portion at the larger conical diameter portion and partially encloses the jaw members, the cone member having at least one corrosion resistant inside cone surface for guiding the jaw members during movement of the jaw members along the aperture axes. Also, nut means are connected to the jaw members and engage the threaded shaft portion for advancing and retracting the jaw members along the aperture axes upon actuation of the nut means.

Preferably the shaft portion and the plate portion of the body members are integrally formed, and the shaft portion also forms the spindle for a motor-driven tool.

It is also preferred that the cone member is integrally formed from a thin sheet of a corrosion resistant material.

It is still further preferred that the cone member has a cylindrical portion extending from the smaller conical portion with a work-piece receiving port at the axial end thereof, the cylindrical extension enclosing the converging ends of the jaw members and protecting the converging ends against radially directed impact forces.

Further in accordance with the present invention, the method of fabricating a low-cost keyless chuck having a threaded body member for carrying a plurality of elongated jaw members moveable along respective axes converging on the chuck axis, and a cone member for guiding the jaw members during advancing and retracting movement thereof, comprises the steps of upsetting one end of a metal rod to form a body member with a shaft portion and an integral, perpendicular plate portion; forming a plurality of apertures in the plate portion, the apertures being spaced relative to the chuck axis and having respective axes converging on the chuck axis for holding the jaw members; deep drawing a hollow cone member from a sheet of corrosion resistant material to provide an inside conical surface for guiding the converging jaw members; and crimping the larger diameter cone portion to the periphery of the body member plate portion.

The accompanying drawings which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
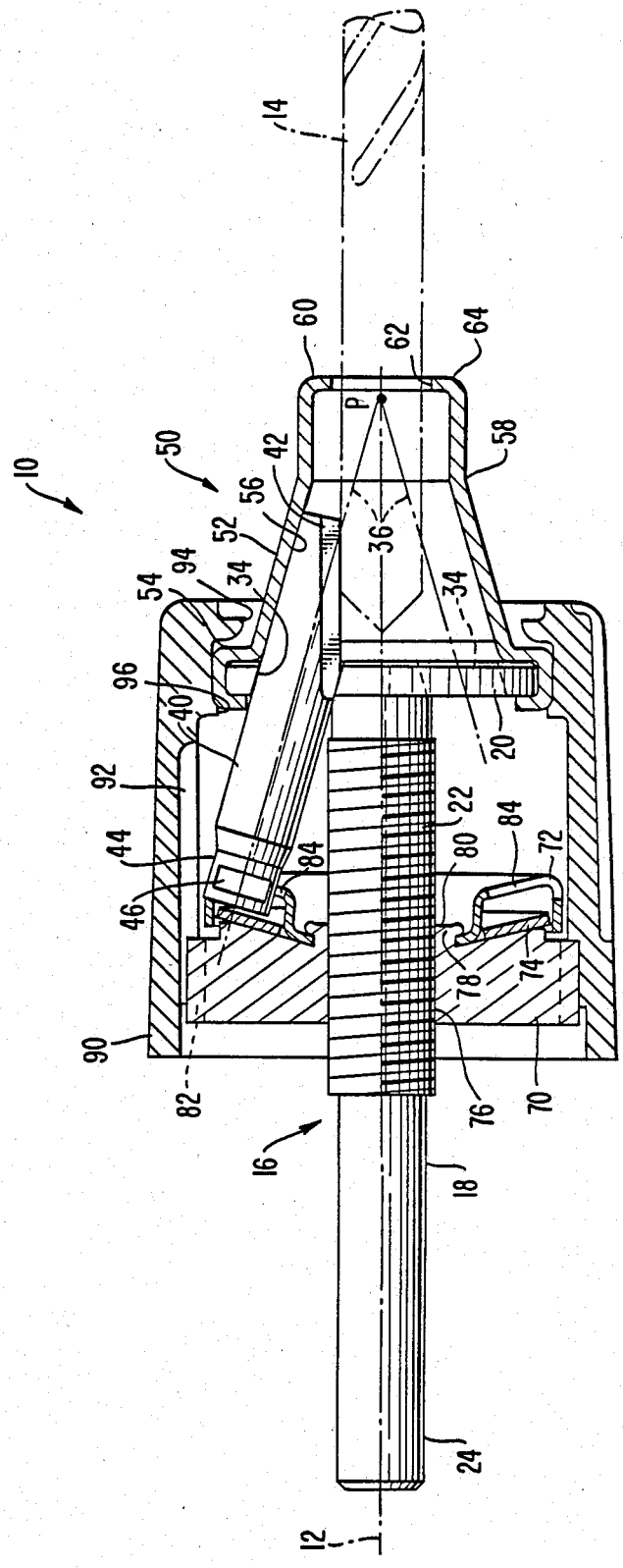
FIG. 1 is a cross-sectional view of a low-cost keyless chuck made in accordance with the present invention.

The preferred embodiment of the low cost, keyless chuck of the present invention is shown in FIG. 1 and is represented generally by the numeral 10. Chuck 10 is intended to be rotated about a chuck axis 12 while holding a work-piece such as the twist drill bit 14 shown schematically in the drawing. Chuck 10 is particularly adapted for relatively light duty, low torque operations, such as would be carried out using hand-held, battery operated reversible drills and screwdrivers. However, the present invention is not intended to be limited by such applications but only by the appended claims and their equivalents.

In accordance with the present invention, the low cost keyless chuck includes a body member having a threaded shaft portion and a rigid plate portion. The threaded shaft portion has an end configured to be drivingly rotated in either direction about the chuck axis while the plate portion is oriented perpendicular to the shaft portion and rigidly connected to the shaft at a location distant the end at which the shaft is driven. As embodied herein, with initial reference to FIG. 1, chuck 10 includes body member 16 having shaft portion 18 and circular plate portion 20. Shaft portion 18 includes threaded section 22 (relatively fine threads are used) and an unthreaded end 24 suitable for being rotatingly driven about chuck axis 12. Although not shown, shaft end 24 can be provided with a key or other mechanism for providing positive engagement with the prime mover.

Figure 2:
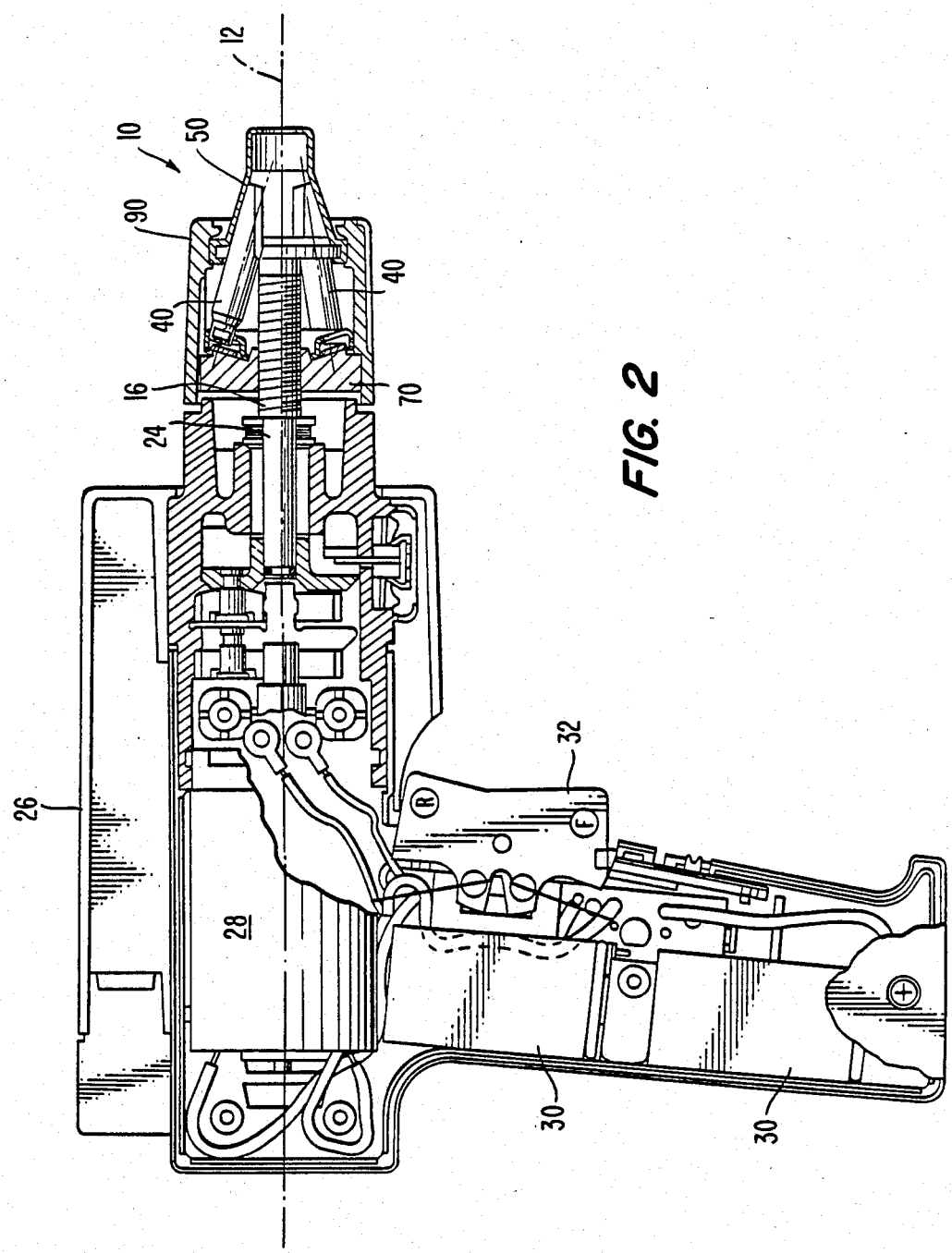
FIG. 2 is a schematic cross-section of the chuck of FIG. 1 installed in a hand-held, battery powered electric drill.

Preferably, however, and with respect to FIG. 2, end 24 of shaft portion 18 forms the spindle for a compact, portable handheld electric drill 26, which spindle is driven by electric motor 28. Batteries 30 provide the electric power which is controlled by finger-actuated trigger switch 33, as is conventional. Integrating shaft portion 18 within the overall drill assembly leads to a simplified overall drill design and corresponding reductions in cost.

Further in accordance with the present invention, a plurality of apertures is formed in the plate portion of the body member, which apertures are spaced about the chuck axis of rotation. Moreover, the axes of the apertures converge on the chuck axis at a point distant the plate portion. As embodied herein and with reference again to FIG. 1, apertures 34 are formed in plate 20 and have respective axes 36 which intersect at point P on chuck axis 12. The depicted embodiment has a total of three apertures (only 2 being shown) located at 120 degree intervals about chuck axis 12. The angles of convergence between each of the respective aperture axes 34 and chuck axis 12 is about 15 degrees. A different number of apertures can be used, of course, depending upon the design of the jaw members.

Further in accordance with the present invention, the chuck includes a plurality of jaw members each slidably disposed in a respective one of the apertures. As embodied herein, and with continued reference to FIG. 1, three elongated jaw members 40 (only one being shown) are slidably disposed in respective apertures 34. Each jaw member has a work-piece-gripping end 42 which can be configured with a concave tip radius (not shown) to provide good mating engagement with a work-piece such as drill bit 14. Each jaw member 40 also has opposed end 44 for engagement by means to be discussed hereinafter to advance and retract jaw members 40 along axes 36 through apertures 34. In the disclosed embodiment, jaw members 40 are generally circular in cross-section but other cross-sectional shapes such as rectangles or squares can be utilized.

Further in accordance with the present invention, the chuck includes a hollow tapered member rigidly fixed to the plate portion at the larger diameter portion and extending to partially enclose the jaw members. Importantly, the hollow tapered member has at least one corrosion resistant inside tapered surface for guiding the jaw members during movement of the jaw members along the aperture axes. As embodied herein, and with continued reference to FIG. 1, chuck 10 includes a hollow cone member 50 having a conical portion 52 the larger diameter portion 54 of which is fixed to the periphery of body member plate portion 20. Conical portion 52 has inside surface 56 which is configured to contact and guide jaw member 40 during advancing and retracting motion along axes 36. Although conical section 52 as depicted has a circular cross-section, section 52 can be formed with lobed areas at the angular positions corresponding to the jaw member locations, which lobed areas can provide a guiding surface contacting the jaw member about a greater extent of the jaw member periphery. Preferably, the hollow tapered member such as cone member 50 is made entirely of a corrosion resistant material so as also to provide a corrosion resistant exterior for good appearance.

Preferably, cone member 50 has a constant diameter section extending from the smaller diameter conical portion, such as extension 60 on smaller conical portion 58. Extension 60 has port 62 formed in axial face 64 to allow the work-piece to be engaged by jaw members 40. Importantly, extension 60 serves to protect the jaw members from radial impact forces relative to the chuck axis 12, such as can occur by dropping the chuck or the tool containing the chuck. Extension 60 also serves to partially enclose jaw members 40 and help prevent contamination which could interfere with the advancing and retracting motion of the jaw members.

Further in accordance with the present invention, the chuck includes nut means connected to the jaw members and also engaging the threaded shaft portion for advancing and retracting the jaw members along the aperture axes upon actuation of the nut means. As embodied herein, and with continued reference to FIG. 1, the nut means includes annular nut member 70, annular jaw member retainer 72, and bevel washer 74. Nut member 70 has inner diameter portion 76 sized and threaded to be engageable with threaded shaft section 22 and also an axially extending flange portion 78. Bevel washer 74 and jaw member retainer 72 are mounted on flange portion 78 so that both retainer 72 and bevel washer 74 can rotate independently of nut member 70 but are constrained to move axially with nut member 70. Jaw member retainer 72 has three radial slots 84 angularly spaced at 120 degree intervals and sized and configured to engage slots 46 formed in jaw member ends 44. In this manner, jaw members 40 are constrained to move axially with nut member 70 as that part is rotated on threaded shaft section 22, and the work-piece-engaging ends 42 are oriented to properly contact the work piece. Bevel washer 74 exerts a biasing force between nut member 70 and each of jaw member ends 44 to assure axial alignment of the jaw members.

It is also preferred that the chuck of the present invention include a sleeve member for hand-actuating the nut means. The sleeve member is rotatably held by the cone member and transmits substantially no torque between the nut member and the cone member during driven rotation of the chuck. As embodied herein, and with continued reference to FIG. 1, chuck 10 includes cylindrical sleeve 90 having inner splines 92 which are engaged by keys 82 formed in the outer periphery of nut member 70. Splines 92 allow nut member 70 to move axially relative to sleeve 90 but prohibits relative rotational movement between these parts. Sleeve 90 also is provided with flange 94 and shoulder 96 on the inner circumference to engage larger diameter portion 54 of cone member 50. The respective dimensions of sleeve 90, flange 94, and shoulder 96 are chosen to prohibit relative axial motion between sleeve 90 and cone member 50 but to allow relative rotational movement between these parts. Sleeve 90 thus permits nut member 70 to be turned while enclosing nut member 70 and the portions of jaws members 44 not enclosed by cone member 50, irrespective of the axial position of nut member 70. Sleeve 90 thus helps protect the nut means and jaw members 40 against contamination which might interfere with the intended operation of the chuck.

In accordance with the present invention, the method for fabricating the low cost keyless chuck described above includes the initial step of "upsetting" one end of a metal rod to form a body member with a shaft portion and an integral, perpendicular plate portion. As embodied herein and with reference to FIG. 1, body member 16 is formed by upsetting a metal rod to form a plate portion 20 at one end of the rod, with the undeformed rod comprising the shaft portion 18. "Upsetting" or "cold heading" is a metal forming method typically used to form nail and screw heads and is a comparatively low cost compared to standard machining operations, such as turning, which ordinarily would be used to form such an integral body member of the configuration of body member 16. Threaded shaft section 22 can be formed after the upsetting process by a standard threading operation.

The next step in accordance with the method of the present invention includes the step of forming the plurality of apertures in the plate portion. As embodied herein, a standard drilling operation is used to form apertures 36 in plate portion 20 because of the use of jaw members 40 having a circular cross section. If jaw members having a non-circular cross-section, such as rectangular, or triangular, are used, a different aperture forming operation may be required, or an additional metal forming operation may have to be carried out to achieve the desired cross-section, such as drilling followed by hobbing.

Further in accordance with the method of the present invention, the hollow tapered member is formed from a continuous sheet of corrosion resistant material by deep drawing to provide a corrosion resistant inside tapered surface for guiding the converging jaw members. Deep drawing, like upsetting, is particularly conductive to high volume low cost production compared to machining a solid part to provide the desired hollow conical structure, or finish machining a cast part. As embodied herein, hollow cone member 50 is formed from a relatively thin sheet of corrosion resistant material such as stainless steel by a deep drawing operation. Importantly, forming cone member 50 by deep drawing allows cone member 50 to be made entirely of a corrosion resistant material such as Type 302 stainless steel (0.032 inch thick sheet) or a similar material so that cone member 50 always presents a corrosion resistance guide surface 56 to contact jaw members 40, irrespective of the amount of wear on guide surface 56. Corrosion on guide surface 56 can dramatically increase friction, possibly leading to difficulties in advancing or retracting jaw members 40.

Further in accordance with the method of the present invention, the hollow tapered member is fixed to the body member plate portion by crimping the larger diameter portion to the periphery of the body member plate portion. As embodied herein, larger diameter conical member portion 54 is shown crimped around the periphery of plate portion 20 to form a subassembly comprising body member 16 and cone member 50.

Preferably, the method of the present invention also includes forming a nut means subassembly for engaging the threaded body member and the ends of the jaw members distant the workpiece-gripping ends. As embodied herein, the nut means subassembly forming step includes providing an annular nut member that is threaded on the inside diameter and has an axially extending flange, such as nut member 70 having inner threaded diameter 76, and flange 78; providing and loosely assembling on the flange a bevel washer and an annular jaw member retainer, such as bevel washer 74 and annular jaw member retainer 72; and radially deforming the axial end of the flange by a "staking" operation to capture the bevel washer and annular jaw member retainer so that at least the retainer is rotatable after the radially forming step. Again, staking is a low cost operation compared to machining flange 78 to provide for a separate locking pin or nut, which would result in a more complex nut means or additional manufacturing operations, with attendant additional costs.

It is finally preferred that the chuck is assembled by first attaching ends 44 of each jaw member 40 to retainer 72 and then concurrently threading nut member 70 on body member shaft threaded portion 22 while inserting the work-piece-gripping ends 42 of the jaw members into apertures 34 in body member plate portion 20. While this operation requires hand assembly, the use of the two subassemblies, namely the body member 16 with attached cone member 50, and also nut member 70 with attached bevel washer 74 and jaw member retainer 72, facilitates the final assembly and allows a high output per assembly worker.

It will be apparent to those skilled in the art that various modifications and variations can be made in the low-cost keyless chuck, and method of fabrication thereof, of the present invention without departing from the scope or spirit of the invention. Thus, it is intended that the present invention cover the modifications and variations of this invention provided they come within the scope of the appended claims and their equivalents.

What is claimed is:

1. A low-cost keyless chuck having an axis, the chuck being operable in both forward and reverse rotation about the chuck axis, the chuck comprising:

a body member having a threaded shaft portion with an end configured to be drivingly rotated about the chuck axis, said body member also having a plate portion rigidly connected to said threaded shaft portion, the plate portion having a peripheral edge and being oriented perpendicular to said threaded shaft portion and located distant said shaft end;

a plurality of apertures formed in said plate portion and spaced about the chuck axis of rotation, said apertures having respective axes converging on said chuck axis at a point distant said plate portion;

a plurality of jaw members each slidably disposed in a respective one of said apertures, said jaw members having respective work-piece-gripping ends positioned to converge on said chuck axis, said jaw members also having respective opposed ends which diverge from said chuck axis;

a hollowed tapered member having a larger diameter portion and a smaller diameter portion, said larger diameter portion being rigidly fixed to said plate portion, wherein said hollow tapered member is crimped to said peripheral edge of said plate portion, said tapered member partially enclosing said jaw members, said tapered member having at least one corrosion resistant inside tapered surface distant said plate portion for guiding said jaw members during movement of said jaw members along said aperture axis; and nut means connected to said jaw members and engaging said threaded shaft portion for advancing and retracting said jaw members along said aperture axes upon actuation said nut means.

2. The low-cost keyless chuck as in claim 1 wherein said hollow tapered member is integrally formed from a thin sheet of a corrosion resistant material.

3. A low-cost keyless chuck having an axis, the chuck being operable in both forward and reverse rotation about the chuck axis, the chuck comprising:

a body member having a threaded shaft portion with an end configured to be drivingly rotated about the chuck axis, said body member also having a plate portion rigidly connected to said threaded shaft portion, the plate portion having a peripheral edge and being oriented perpendicular to said threaded shaft portion and located distant said shaft end;

a plurality of apertures formed in said plate portion and spaced about the chuck axis of rotation, said apertures having respective axes converging on said chuck axis at a point distant said plate portion;

a plurality of jaw members each slidably disposed in a respective one of said apertures, said jaw members having respective work-piece-gripping ends positioned to converge on said chuck axis, said jaw members also having respective opposed ends which diverge from said chuck axis;

a hollowed tapered member having a larger diameter portion and a smaller diameter portion, said larger diameter portion being rigidly fixed to said plate portion, said tapered member partially enclosing said jaw members, said tapered member having at least one corrosion resistant inside tapered surface distant said plate portion for guiding said jaw members during movement of said jaw members along said aperture axes; and nut means connected to said jaw members and engaging said threaded shaft portion for advancing and retracting said jaw members along said aperture axes upon actuation said nut means, wherein said hollow tapered member has a constant diameter hollow portion extending from said smaller diameter portion and having a work-piece receiving port at the axial end thereof, said constant diameter portion radially enclosing the work-piece-gripping ends of said jaw members and protecting said work-piece-gripping ends against radially directed impact forces.

4. A low-cost keyless chuck having an axis, the chuck being operable in both forward and reverse rotation about the chuck axis, the chuck comprising:

a body member having a threaded shaft portion with an end configured to be drivingly rotated about the chuck axis, said body member also having a plate portion rigidly connected to said threaded shaft portion, the plate portion having a peripheral edge and being oriented perpendicular to said threaded shaft portion and located distant said shaft end;

a plurality of apertures formed in said plate portion and spaced about the chuck axis of rotation, said apertures having respective axes converging on said chuck axis at a point distant said plate portion;

a plurality of jaw members each slidably disposed in a respective one of said apertures, said jaw members having respective work-piece-gripping ends positioned to converge on said chuck axis, said jaw members also having respective opposed ends which diverge from said chuck axis;

a hollowed tapered member having a larger diameter portion and a smaller diameter portion, said larger diameter portion being rigidly fixed to said plate portion said tapered member partially enclosing said jaw members, said tapered member having at least one corrosion resistant inside tapered surface distant said plate portion for guiding said jaw members during movement of said jaw members along said aperture axes; and nut means connected to said jaw members and engaging said threaded shaft portion for advancing and retracting said jaw members along said aperture axes upon actuation said nut means, wherein said nut means further includes an annular nut member threadingly engaging said shaft portion, an annular retainer member attached to said nut member at one axial end thereof and being constrained for axially dependent, and rotationally independent, movement with respect to said nut member, said retainer member engaging said jaw members proximate said opposed ends thereof, and annular thrust bearing means positioned between said nut member and said retainer member and contacting said jaw member opposed ends, for biasing said jaw members along said aperture axes, wherein said thrust bearing means includes a bevel washer which is constrained for axially dependent and rotationally independent movement, with respect to said nut member.

5. The low-cost keyless chuck as in claim 4 wherein said shaft portion and said plate portion of said body member are integrally formed.

6. The low-cost keyless chuck as in claim 4 wherein said body member shaft portion also is configured for use as a spindle for a motor-driven tool.

7. The low-cost keyless chuck as in claim 4 further including hand-actuated means engaged to said nut member for advancing and retracting said nut member along said shaft portion.

8. A low-cost keyless chuck having an axis, the chuck being operable in both forward and reverse rotation about the chuck axis, the chuck comprising:

a body member having a threaded shaft portion with an end configured to be drivingly rotated about the chuck axis, said body member also having a plate portion rigidly connected to said threaded shaft portion, the plate portion having a peripheral edge and being oriented perpendicular to said threaded shaft portion and located distant said shaft end;

a plurality of apertures formed in said plate portion and spaced about the chuck axis of rotation, said apertures having respective axes converging on said chuck axis at a point distant said plate portion;

a plurality of jaw members each slidably disposed in a respective one of said apertures, said jaw members having respective work-piece-gripping ends positioned to converge on said chuck axis, said jaw members also having respective opposed ends which diverge from said chuck axis;

a hollowed tapered member having a larger diameter portion and a smaller diameter portion, said larger diameter portion being rigidly fixed to said plate portion, said tapered member partially enclosing said jaw members, said tapered member having at least one corrosion resistant inside tapered surface distant said plate portion for guiding said jaw members during movement of said jaw members along said aperture axes; and nut means connected to said jaw members and engaging said threaded shaft portion for advancing and retracting said jaw members along said aperture axes upon actuation of said nut means, wherein said nut means further includes an annular nut member threadingly engaging said shaft portion, an annular retainer member attached to said nut member at one axial end thereof and being constrained for axially dependent, and rotationally independent movement with respect to said nut member, said retainer member engaging said jaw members proximate said opposed ends thereof, and an annular thrust bearing means positioned between said nut member and said retainer member and contacting said jaw member opposed ends, for biasing said jaw members along said aperture axes, wherein said annular nut member is provided with an axially extending flange and wherein said annular retainer member and said thrust bearing means are loosely mounted on said flange, said flange being deformed and said retainer member and said thrust bearing means being axially captured by said deformed flange.

9. The low-cost keyless chuck as in claim 8 wherein said sleeve member is formed from a plastic material.

10. The low-cost keyless chuck as in claim 8 wherein said sleeve member is keyed to said nut member to provide rotationally dependent movement with respect to said nut member, and wherein said sleeve member encloses said nut means for protecting against contamination.

* * * * *